(12) United States Patent
Nakamura et al.

(10) Patent No.: US 12,351,025 B2
(45) Date of Patent: Jul. 8, 2025

(54) USER OPERATION DEVICE AND IN-VEHICLE DEVICE CONFIGURED FOR PRESS-DOWN OPERATION

(71) Applicant: PANASONIC INTELLECTUAL PROPERTY MANAGEMENT CO., LTD., Osaka (JP)

(72) Inventors: Shinya Nakamura, Kanagawa (JP); Takuya Ueda, Kanagawa (JP); Yukihiro Araki, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 438 days.

(21) Appl. No.: 17/704,370

(22) Filed: Mar. 25, 2022

(65) Prior Publication Data

US 2022/0305917 A1   Sep. 29, 2022

(30) Foreign Application Priority Data

Mar. 26, 2021 (JP) .................................. 2021-052947

(51) Int. Cl.
*B60K 35/10* (2024.01)
*B60K 35/00* (2006.01)
(Continued)

(52) U.S. Cl.
CPC .............. *B60K 35/10* (2024.01); *B60K 35/00* (2013.01); *H01H 13/14* (2013.01); *B60K 35/22* (2024.01);
(Continued)

(58) Field of Classification Search
CPC ........ B60K 35/10; B60K 35/00; B60K 35/22; B60K 2360/1446; B60K 2360/42;
(Continued)

(56) References Cited

U.S. PATENT DOCUMENTS 5,876,243 A    3/1999 Sangawa
6,069,327 A *  5/2000 Ushimaru ................. B60R 1/07
                                                       200/6 A
(Continued)

FOREIGN PATENT DOCUMENTS

JP    09-204842     8/1997
JP    2010-192243   9/2010

OTHER PUBLICATIONS

Office Action issued for corresponding Japanese Patent Application No. 2021-052947 dated May 21, 2024, along with English-language translation.

*Primary Examiner* — Lheiren Mae A Caroc
(74) *Attorney, Agent, or Firm* — GREENBLUM & BERNSTEIN, P.L.C.

(57) ABSTRACT

A first user operation unit includes a top surface and a first wall part extending downward from an outer side of the top surface. A press-down operation in the top surface allows the first user operation unit to move in a vertical direction. A holder supports the first user operation unit from below and includes a circuit board on a bottom surface of the holder. An outer wall part of the holder extends upward from an outer side of the circuit board and is provided outside the first wall part of the first user operation unit. Eaves of the first user operation unit extend outward from the first wall part and covers the outer wall part of the holder from above.

13 Claims, 5 Drawing Sheets

(51) Int. Cl.
*H01H 13/14* (2006.01)
*B60K 35/22* (2024.01)

(52) U.S. Cl.
CPC .. *B60K 2360/1446* (2024.01); *B60K 2360/42* (2024.01); *B60K 2360/691* (2024.01); *H01H 2239/034* (2013.01)

(58) Field of Classification Search
CPC ............ B60K 2360/691; B60K 35/213; B60K 35/214; H01H 13/14; H01H 2239/034; H01H 2223/004; H01H 13/86; H01H 13/06
See application file for complete search history.

(56) References Cited

U.S. PATENT DOCUMENTS 8,497,440 B2 * 7/2013 Kitahara ................ H01H 13/06
 200/302.2
10,056,201 B2 * 8/2018 Miyaoka ................ H01H 13/14

\* cited by examiner

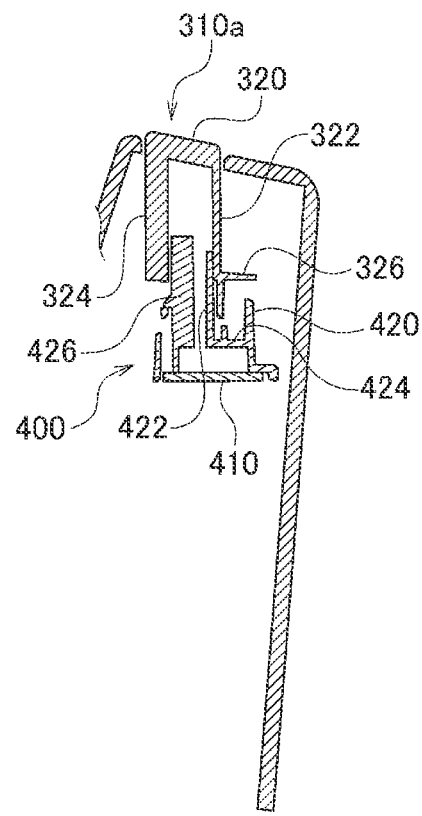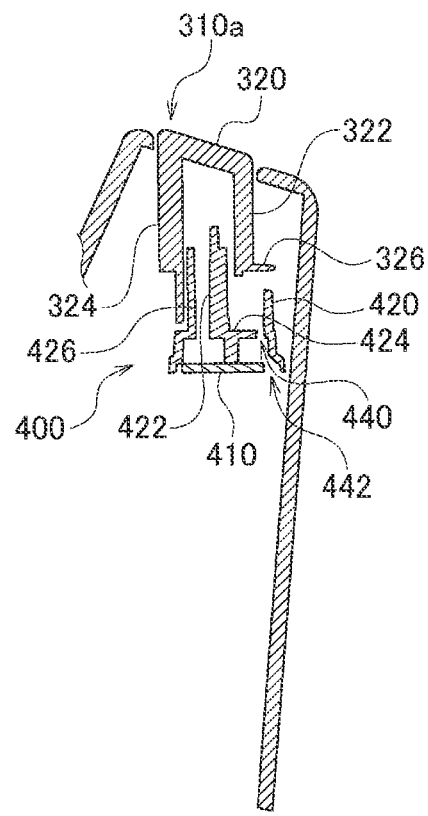

USER OPERATION DEVICE AND IN-VEHICLE DEVICE CONFIGURED FOR PRESS-DOWN OPERATION

BACKGROUND

1. Field

The present invention relates to a user operation device and an in-vehicle device configured for press-down operation.

2. Description of the Related Art

User operation devices are desired that are not likely to affect the circuit board adversely even when moisture enters a meter from around a knob. For example, a flange part is provided between the protection cover and the case of a user control shaft, and the flange part prevents infiltration into the opening of the case (see, for example, patent literature 1).

[Patent Literature 1] JP 2010-192243

Even when a flange part is provided, the circuit board is adversely affected in the event of infiltration from the knob opening in the housing.

SUMMARY

The present disclosure addresses the above-described issue, and a purpose thereof is to provide technology of inhibiting adverse effects on the circuit board in the event of infiltration from the knob opening in the housing.

A user operation device according to an embodiment of the present disclosure includes: a user operation unit that includes a top surface and a wall part extending downward from an outer side of the top surface, a press-down operation in the top surface allowing the user operation unit to move in a vertical direction; and a holder that supports the user operation unit from below and includes a circuit board on a bottom surface of the holder. The holder includes: an outer wall part that extends upward from an outer side of the circuit board and is provided outside the wall part of the user operation unit. The user operation unit includes: eaves that extend outward from the wall part and cover the outer wall part of the holder from above.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 5A-5B are cross-sectional views showing a structure of the user operation device of FIG. 3.

DETAILED DESCRIPTION

Figure 1:
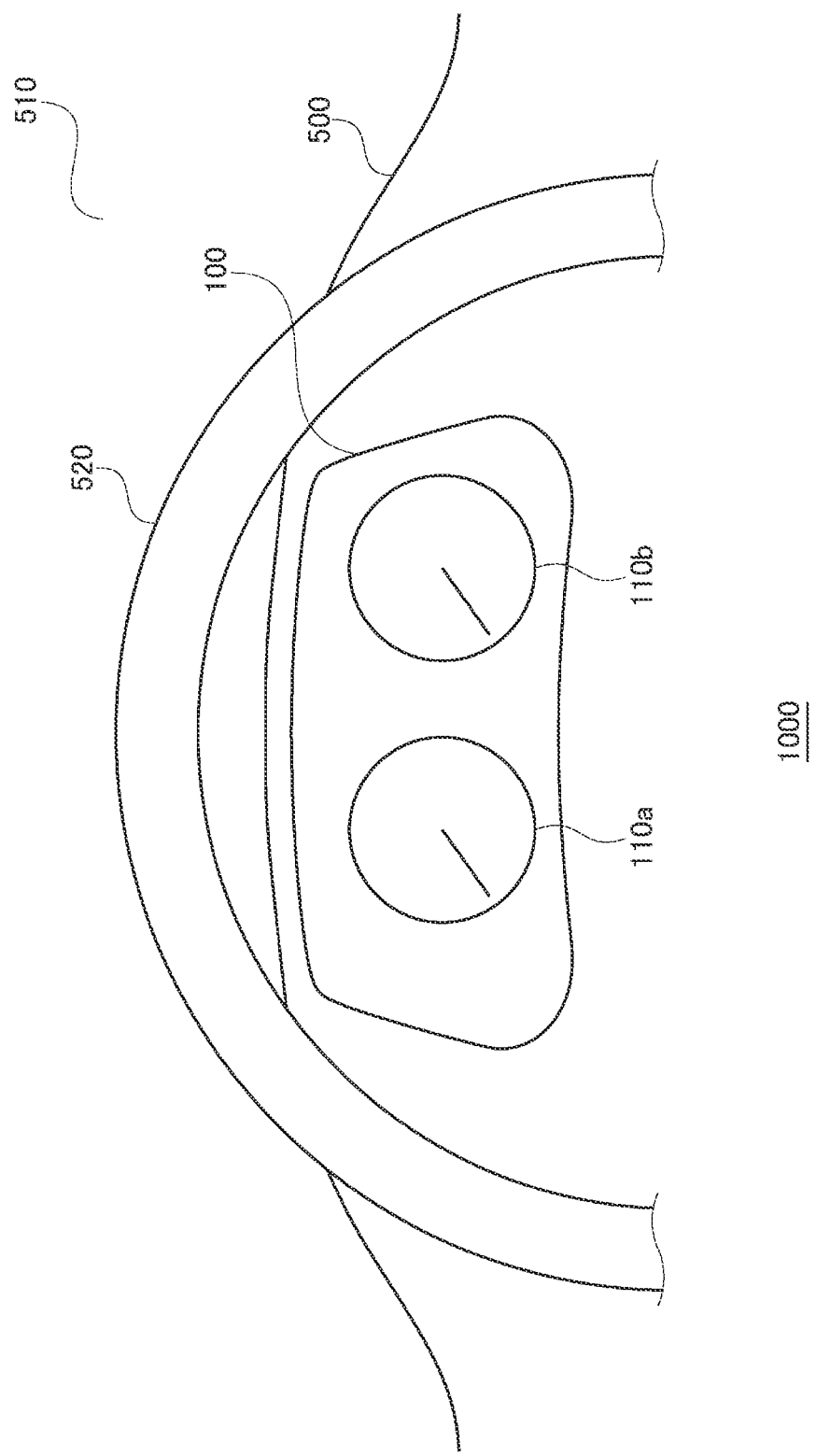
FIG. 1 shows a structure of the vehicle interior of a vehicle according to an embodiment.

The invention will now be described by reference to the preferred embodiments. This does not intend to limit the scope of the present invention, but to exemplify the invention.

A brief summary will be given before describing the present disclosure in specific details. The embodiment relates to a user operation device in an electronic appliance that can be mounted on a vehicle. An example of the electronic appliance is a display device. The display device is mounted in the dashboard of the vehicle and displays an image of a speedometer for presenting a traveling speed, an image of a tachometer for presenting the number of revolutions of the engine per minute (hereinafter, may be generically referred to as "meter images"), etc. The user operation device is a push-button switch. A push-button switch is mounted on the steering in the related art and includes a large-sized push-button knob. When the size of a push-button knob is large, structures such as a guide rib for inhibiting rattling of the push button and a plunger for turning a tact switch on/off are all included in the space behind the push-button knob. Therefore, the opening of the holder for holding the push-button knob is housed in the space behind the knob for prevention of drip and dust from outside. The opening of the holder is a hole through which something can reach the circuit board.

If the push-button knob is small, however, the guide and the plunger cannot be entirely included in the space behind the knob so that the opening of the holder is exposed outside the knob. As a result, water from outside, etc. enters the opening of the holder and adversely affects the circuit board. Thus, a structure for inhibiting water infiltration into the circuit board from outside is required in the user operation device mounted on an in-vehicle appliance (meter).

A purpose of the embodiment is to realize a switching structure provided with a push-button knob capable of not drawing water invading from outside to the circuit board inside the product, by designing the shape of the knob and the holder properly. In the user operation device according to the embodiment, eaves for draining water are provided on the outer surface of the push-button knob. In further accordance with the embodiment, the end of the wall part provided outside the holder (hereinafter, "outer wall part") is configured as a slope that descends outward. Therefore, water drops dropping from the end of the eaves are discharged outside. In still further accordance with the embodiment, water circulated around the eaves and entering inside flows between the outer wall part and the wall part provided inside the knob (hereinafter, "inner wall part") provided above the holder and is discharged from the drains of the holder and the circuit board. The terms "parallel" and "orthogonal" in the following description not only encompass completely parallel or orthogonal but also encompass slightly off-parallel and slightly non-orthogonal within the margin of error. The term "substantially" means identical within certain limits.

FIG. 1 shows a structure of the vehicle interior of a vehicle 1000. The figure shows a view in front of the driver's seat. A display device 100 is fixed in a dashboard 500. A first meter image 110a and a second meter image 110b, which are generically referred to as meter images 110, are displayed on the display device 100. The first meter image 110a is, for example, an image of a speedometer, and the second meter image 110b is, for example, an image of a tachometer. A front window 510 is provided above the dashboard 500, and a steering wheel 520 is provided closer to the driver than the dashboard 500. Accordingly, the driver (not shown) manipulating the steering wheel 520 can view the meter images 110 displayed on the display device 100 while, at the same time, seeing the scene in front through the front window 510.

Figure 2:
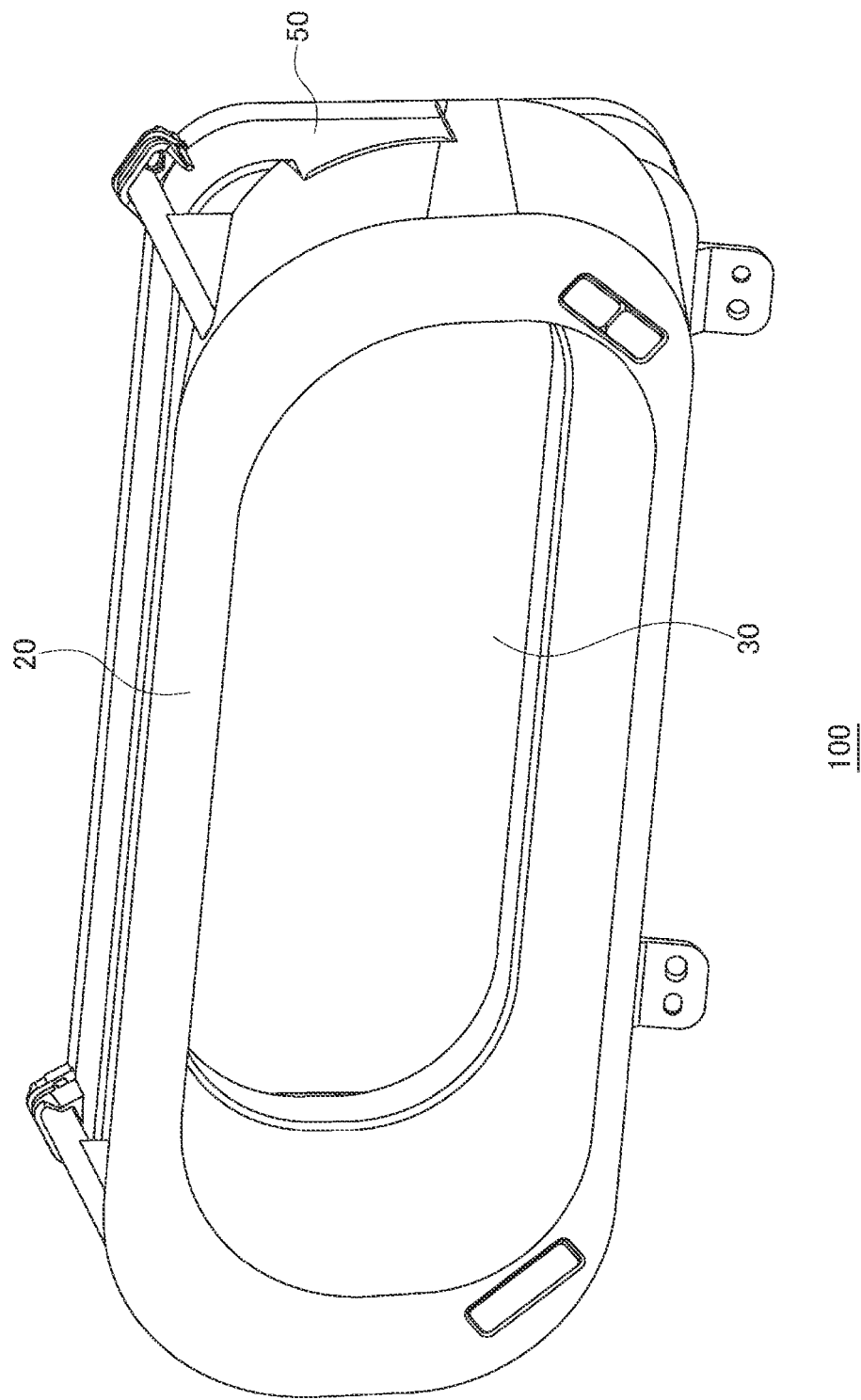
FIG. 2 is a perspective view showing a structure of the display device of FIG. 1.
Figure 3:
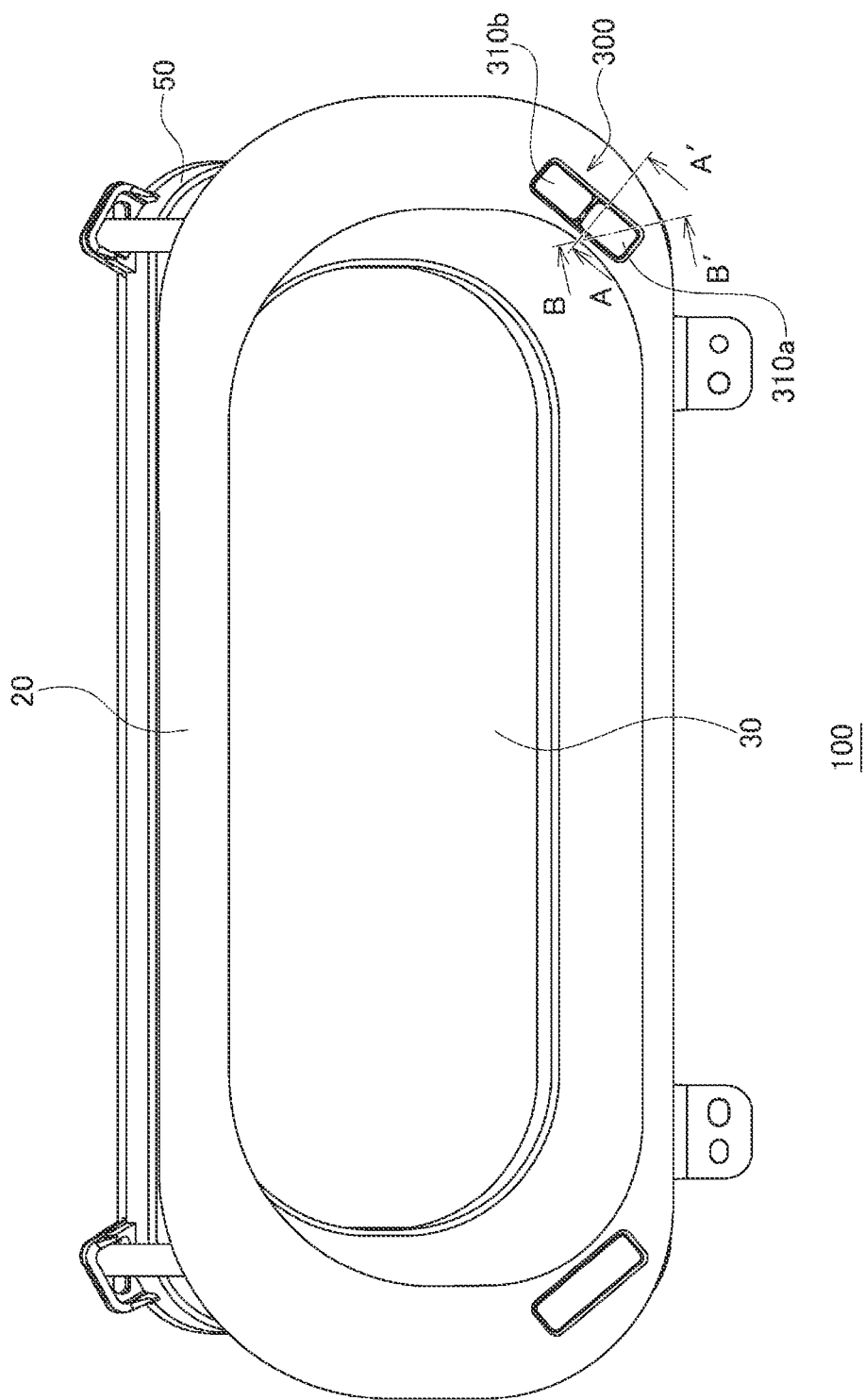
FIG. 3 is a front view showing a structure of the display device of FIG. 1.

FIG. 2 is a perspective view showing a structure of the display device 100, and FIG. 3 is a front view showing a structure of the display device 100. A front housing 20 is made of, for example, a resin and includes an opening that extends through in the longitudinal direction. A display unit 30 is provided behind the opening of the front housing 20. Further, a rear housing 50 is provided behind the front housing 20 and the display unit 30. By coupling the front housing 20 and the rear housing 50 in the longitudinal direction, the display unit 30 is provided inside. A user operation device 300 is provided in the lower right part of the front housing 20. The user operation device 300 includes a first user operation unit 310*a* and a second user operation unit 310*b*, which are generically referred to as user operation units 310. The first user operation unit 310*a* and the second user operation unit 310*b* are arranged. The first user operation unit 310*a* is provided on the left, and the second user operation unit 310*b* is provided on the right. The first user operation unit 310*a* and the second user operation unit 310*b* are the aforementioned push-button knobs and can be pressed down.

Figure 4C:
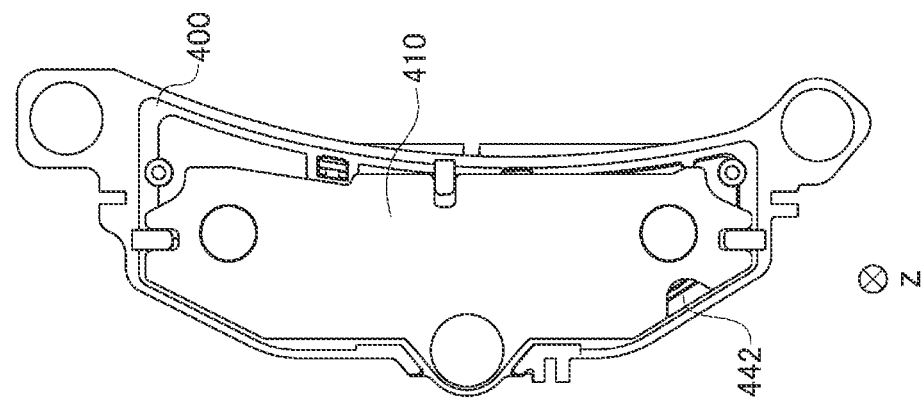
FIGS. 4A-4C show a structure of the user operation device of FIG. 3.
Figure 4B:
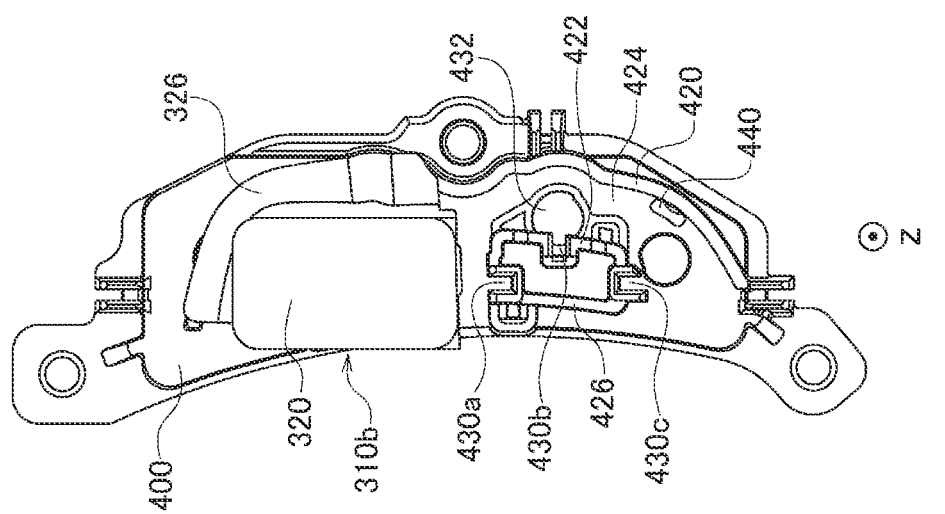
Figure 4A:
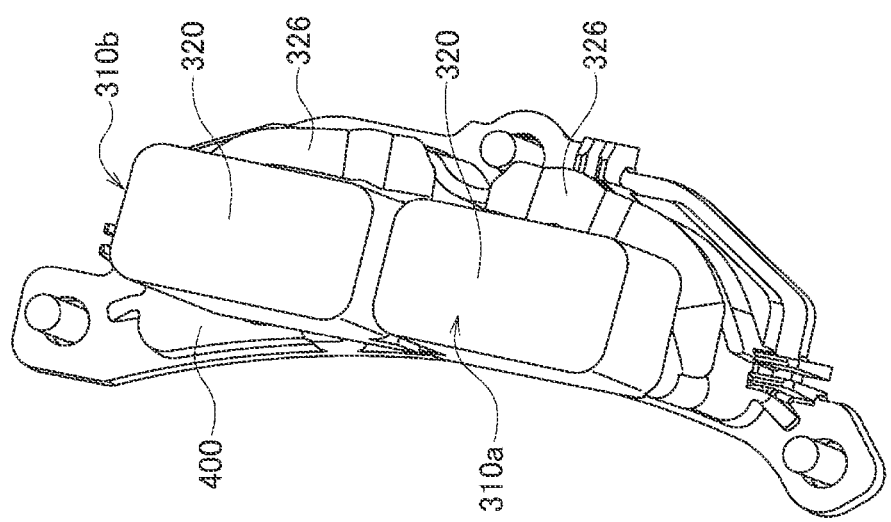

FIGS. 4A-4C show a structure of the user operation device 300. FIG. 4A shows a structure of the user operation device 300 removed from the display device 100 of FIG. 3. The first user operation unit 310*a* and the second user operation unit 310*b* are provided in front of a holder 400 and can be pressed down toward the holder 400. FIGS. 4B-4C, FIGS. 5A-5B are also used to describe the structure of the user operation device 300 in further details. FIGS. 5A-5B are cross-sectional views showing a structure of the user operation device 300.

The z axis as shown in FIGS. 4B-4C, FIGS. 5A-5B is defined. The z axis is defined along the longitudinal direction of FIG. 3, FIG. 4A. Hereinafter, the positive direction of the z axis may be referred to as "above", "upward", and the negative direction of the z axis may be referred to as "below", "downward". FIG. 4B is a view from above of the user operation device 300 with the first user operation unit 310*a* removed, and FIG. 4C is a view of the user operation device 300 from below. FIG. 5A is an A-A' cross-sectional view of the user operation device 300, and FIG. 5B is a B-B' cross-sectional view of the user operation device 300. Hereinafter, the directions of A and B may be referred to as "inward", and the directions of A' and B' may be referred to as "outward".

A top surface 320 is provided on top of the first user operation unit 310*a*. A first wall part 322 extends downward from the outer end of the top surface 320, and a second wall part 324 extends downward from the inner end of the top surface 320. Eaves 326 of the first user operation unit 310*a* extend outward from the first wall part 322. The top surface 320, the first wall part 322, the second wall part 324, and the eaves 326 are, for example, formed of a resin so as to be integrated with each other.

The holder 400 supports the first user operation unit 310*a* and the second user operation unit 310*b* from below. The bottom surface of the holder 400 includes a circuit board 410. An outer wall part 420 extends upward from the outer side of the circuit board 410 and is provided outside the first wall part 322 of the user operation unit 310. The upper side of the outer wall part 420 is covered by the eaves 326. Further, the upper end of the outer wall part 420 has a slope that descends in the outward direction.

The inner wall part 422 is provided inward of the outer wall part 420 and the first wall part 322 of the user operation unit 310 and extends in the vertical direction. The lower end of the inner wall part 422 and the inner side surface of the outer wall part 420 are connected by a groove bottom part 424. The outer wall part 420, the inner wall part 422, and the groove bottom part 424 form a groove. It can be said that the groove bottom part 424 connects the outer wall part 420 and the inner wall part 422 above the circuit board 410. Further a first drain hole that extends through the groove bottom part 424 in the vertical direction is provided in a part of the groove bottom part 424, and a second drain hole that extends through the circuit board 410 in the vertical direction is provided in a part of the circuit board 410.

A wall part 426 extends upward from the inner side of the circuit board 410 and provided outward of the second wall part 324 of the user operation unit 310. Therefore, the wall part 426 and the second wall part 324 are provided to face each other, and the inner wall part 422 and the first wall part 322 are provided to face each other.

The holder 400 is provided with a first guide groove 430*a*, a second guide groove 430*b*, and a third guide groove 430*c*, which are generically referred to as guide grooves 430. Guide grooves 430 are formed by parallel ribs. A guide rib (not shown) provided in the first user operation unit 310*a* moves along the guide grooves 430. With such a structure, a press-down operation in the top surface 320 allows the first user operation unit 310*a* to move in the vertical direction such that rattling is inhibited. Further, a plunger (not shown) is provided outside the first wall part 322, and the plunger is provided to pass through a plunger hole 432 provided in the holder 400. A press-down operation in the top surface 320 turns the tact switch (not shown) provided in the circuit board 410.

A description will be given below of the flow of water entering the user operation device 300 with such a structure. The water flowing downward along the first wall part 322 drops as it is guided outward by the eaves 326. The water drops outside the outer wall part 420 and so does not easily enter inside the outer wall part 420 from the opening between the eaves 326 and the outer wall part 420. It is difficult for the water to enter inside the outer wall part 420 from the opening, even if it is guided as such, because the upper end of the outer wall part 420 has a slope that descends in the outward direction.

Even if the water enters inside the outer wall part 420 from the opening, the water flows in the groove formed by the outer wall part 420, the inner wall part 422, and the groove bottom part 424. The water flowing in the groove drops from the first drain hole 440 to the circuit board 410. A circuit is not provided at a position on which water drops. The water is discharged by dropping from the second drain hole 442. The second user operation unit 310*b* has a structure equivalent to that the first user operation unit 310*a*.

According to the embodiment, the eaves extend outward from the first wall part and cover the outer wall part of the holder from above so that infiltration from the opening is inhibited. Further, since infiltration from the opening is inhibited, adverse effects on the circuit board are inhibited. Since the upper end of the outer wall part has a slope that descends in the outward direction, infiltration from the opening is inhibited.

Further, since the groove is formed by the inner wall part, the outer wall part, and the groove bottom part, any water infiltrating from the opening is drained down the groove. Further, since the water infiltrating from the opening is drained down the groove, adverse effects on the circuit board are inhibited. Further, since the groove bottom part includes a first drain hole and the circuit board includes a second drain hole, any water infiltrating from the opening is drained from the first drain hole and the second drain hole. Further, any water infiltrating from the opening is drained from the first drain hole and the second drain hole, adverse effects on the circuit board are inhibited.

A summary of an embodiment of the present disclosure is given below. A user operation device according to an embodiment of the present disclosure includes: a user operation unit that includes a top surface and a wall part extending downward from an outer side of the top surface, a press-down operation in the top surface allowing the user operation unit to move in a vertical direction; and a holder that supports the user operation unit from below and includes a circuit board on a bottom surface of the holder. The holder includes: an outer wall part that extends upward from an outer side of the circuit board and is provided outside the wall part of the user operation unit. The user operation unit includes: eaves that extend outward from the wall part and cover the outer wall part of the holder from above.

According to the embodiment, the eaves extend outward from the wall part and cover the outer wall part of the holder from above so that infiltration from the opening is inhibited.

An upper end of the outer wall part has a slope that descends in an outward direction. In this case, the upper end of the outer wall part has a slope so that infiltration from the opening is inhibited.

The holder may further include an inner wall part provided inward of the outer wall part of the user operation unit, and a groove bottom part that connects the inner wall part and the outer wall part above the circuit board. In this case, since the groove is formed by the inner wall part, the outer wall part, and the groove bottom part, adverse effects on the circuit board are inhibited in the event of infiltration from the opening.

The groove bottom part may include a first drain hole. The circuit board may include a second drain hole. In this case, since the groove bottom part includes the first drain hole and the circuit board includes the second drain hole, adverse effects on the circuit board are inhibited in the event of infiltration from the opening.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2021-052947, filed on Mar. 26, 2021, the entire contents of which are incorporated herein by reference.

What is claimed is:

1. A user operation device comprising:
   a user operation unit that includes a top surface and a wall part extending downward from an outer side of the top surface, a press-down operation in the top surface allowing the user operation unit to move in a vertical direction; and
   a holder that supports the user operation unit from below and includes a circuit board on a bottom surface of the holder,
   the holder including:
      an outer wall part that extends upward from an outer side of the circuit board such that the outer wall part is provided outside the wall part in a horizontal direction of the circuit board;
      an inner wall part that is provided inward of the outer wall part;
      a groove bottom part that connects the outer wall part and the inner wall part in the horizontal direction; and
      a plunger hole, through which a plunger passes, defined in the groove bottom part, and
   the user operation unit including:
      eaves that extend outward from the wall part and cover the outer wall part of the holder from above, wherein
      the eaves cover at least a part of the plunger hole when viewed from the vertical direction.

2. The user operation device according to claim 1, wherein
   an upper end of the outer wall part has a slope that descends in an outward direction.

3. The user operation device according to claim 2, wherein
   the groove bottom part connects the inner wall part and the outer wall part above the circuit board.

4. The user operation device according to claim 3, wherein
   the groove bottom part includes a first drain hole, and the circuit board includes a second drain hole.

5. An in-vehicle device comprising the user operation device according to claim 4.

6. An in-vehicle device comprising the user operation device according to claim 3.

7. An in-vehicle device comprising the user operation device according to claim 2.

8. The user operation device according to claim 1, wherein
   the groove bottom part connects the inner wall part and the outer wall part above the circuit board.

9. The user operation device according to claim 8, wherein
   the groove bottom part includes a first drain hole, and the circuit board includes a second drain hole.

10. An in-vehicle device comprising the user operation device according to claim 9.

11. An in-vehicle device comprising the user operation device according to claim 8.

12. An in-vehicle device comprising the user operation device according to claim 1.

13. The user operation device according to claim 1, wherein
   the eaves are disposed within the user operation device.

* * * * *